(12) United States Patent
Ajiki

(10) Patent No.: US 11,436,746 B2
(45) Date of Patent: Sep. 6, 2022

(54) DISTANCE MEASURING CAMERA

(71) Applicant: MITSUMI ELECTRIC CO., LTD., Tokyo (JP)

(72) Inventor: Satoshi Ajiki, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/976,184

(22) PCT Filed: Mar. 11, 2019

(86) PCT No.: PCT/JP2019/009813
§ 371 (c)(1),
(2) Date: Aug. 27, 2020

(87) PCT Pub. No.: WO2019/181622
PCT Pub. Date: Sep. 26, 2019

(65) Prior Publication Data
US 2020/0410707 A1    Dec. 31, 2020

(30) Foreign Application Priority Data

Mar. 19, 2018   (JP) .............................. JP2018-051643

(51) Int. Cl.
*G06T 7/593* (2017.01)
*G06T 7/571* (2017.01)
(Continued)

(52) U.S. Cl.
CPC ................ *G06T 7/571* (2017.01); *G02B 7/09* (2013.01); *H04N 5/232125* (2018.08); *G06T 2207/10148* (2013.01)

(58) Field of Classification Search
CPC ........... G06T 7/571; G06T 2207/10148; G06T 7/593; H04N 5/232125; H04N 5/225;
(Continued)

(56) References Cited

U.S. PATENT DOCUMENTS

2008/0218613 A1    9/2008   Janson et al.
2016/0050407 A1*   2/2016   Chen .................... H04N 13/204
                                                          348/47
(Continued)

FOREIGN PATENT DOCUMENTS

EP    3730898 A1    10/2020
EP    3819588 A1     5/2021
(Continued)

OTHER PUBLICATIONS

ISA Japan Patent Office, International Search Report Issued in Application No. PCT/JP2019/009813, dated Jun. 4, 2019, WIPO, 2 pages.
(Continued)

*Primary Examiner* — Patrick E Demosky
(74) *Attorney, Agent, or Firm* — McCoy Russell LLP

(57) ABSTRACT

This distance measuring camera contains a first optical system for collecting light from a subject to form a first subject image, a second optical system for collecting the light from the subject to form a second subject image, an imaging unit for imaging the first subject image formed by the first optical system and the second subject image formed by the second optical system, and a distance calculating part 4 for calculating a distance to the subject based on the first subject image and second subject image imaged by the imaging part. The distance calculating part 4 calculates the distance to the subject based on an image magnification ratio between a magnification of the first subject image and a magnification of the second subject image.

9 Claims, 5 Drawing Sheets

(51) Int. Cl.
*H04N 5/232* (2006.01)
*G02B 7/09* (2021.01)

(58) Field of Classification Search
CPC ........ H04N 5/232; H04N 13/239; G02B 7/09; G02B 7/28; G01C 3/00; G01C 3/06; G01C 11/06; G01C 3/08; G03B 13/36; G03B 19/07; G03B 35/08
See application file for complete search history.

(56) References Cited

U.S. PATENT DOCUMENTS

| | | |
|---|---|---|
| 2016/0379066 A1 | 12/2016 | Reiche et al. |
| 2017/0034436 A1* | 2/2017 | Inoue .................... G01B 11/14 |
| 2018/0077404 A1* | 3/2018 | Bechtel ................ H04N 13/239 |

FOREIGN PATENT DOCUMENTS

| | | | |
|---|---|---|---|
| JP | H02171737 A | | 7/1990 |
| JP | 03200007 A | * | 3/1991 |
| JP | H03200007 A | | 9/1991 |
| JP | 2001141422 A | * | 5/2001 |
| JP | 2001141422 A | | 5/2001 |
| JP | 2013250856 A | | 12/2013 |
| RU | 2340872 C1 | | 12/2008 |
| WO | 2019030957 A1 | | 2/2019 |

OTHER PUBLICATIONS

European Patent Office, Extended European Search Report Issued in Application No. 19772591.4, dated Dec. 8, 2021, Germany, 9 pages.

* cited by examiner $f_1 \neq f_2$
$D = 0$ $f_1 = f_2 = f$
$D \neq 0$

DISTANCE MEASURING CAMERA

CROSS-REFERENCE TO RELATED APPLICATIONS

The present application is a U.S. National Phase of International Patent Application Serial No. PCT/JP2019/009813 entitled "DISTANCE MEASUREMENT CAMERA," filed on Mar. 11, 2019. International Patent Application Serial No. PCT/JP2019/009813 claims priority to Japanese Patent Application No. 2018-051643 filed on Mar. 19, 2018. The entire contents of each of the above-referenced applications are hereby incorporated by reference for all purposes.

FIELD OF THE INVENTION

The present invention generally relates to distance measuring cameras for measuring a distance to a subject, in particular to a distance measuring camera for measuring a distance to a subject based on an image magnification ratio between at least two subject images respectively formed by at least two optical systems whose changes of magnifications of the subject images according to the distance to the subject are different from each other.

BACKGROUND AND SUMMARY

In recent years, there is proposed a distance measuring camera for measuring a distance to a subject by imaging the subject. As such a distance measuring camera, there is known a stereo camera type distance measuring camera including two or more pairs of an optical system for collecting light from a subject to form a subject image and an image sensor for converting the subject image formed by the optical system to an image signal. Further, there is also known a pattern projection type distance measuring camera including a projector for projecting constant pattern light (such as grid pattern light) onto a subject and an imaging system for imaging the subject onto which the constant pattern light is being projected (for example, see patent document 1).

In the stereo camera type distance measuring camera, the two or more pairs of the optical system and the image sensor are used to obtain a plurality of images having different parallel disparities and the distance to the subject is calculated based on the parallel disparities among the plurality of obtained images. In order to accurately calculate the distance to the subject based on the parallel disparities among the plurality of images, it is necessary to obtain a large parallel disparity. Thus, it is required to arrange the two or more optical systems in one distance measuring camera with being significantly far apart from each other in a direction perpendicular to an optical axis direction thereof. This results in increase in a size of the distance measuring camera. Further, in the stereo camera type distance measuring camera, if the subject is located at a position close to the distance measuring camera, there is a case of obtaining an image in which any feature point of the subject image for obtaining the parallel disparity is shown and another image in which the same feature point of the subject image is not shown due to a relationship between fields of views of the obtained images. In order to avoid this situation, it is necessary to arrange the two or more optical systems with being close to each other. However, when the two or more optical systems are arranged so as to be close to each other, there is a problem that the parallel disparity between the obtained images becomes small and accuracy of the measurement is decreased. Thus, there is a problem that it becomes difficult to accurately calculate the distance to the subject located at a close position with the parallel disparity among the subject images.

In the pattern projection type distance measuring camera, the constant pattern light is projected onto the subject and distortions of the constant pattern light projected onto the subject is analyzed to measure the distance to the subject. Thus, the pattern projection type distance measuring camera needs the projector for projecting the constant pattern light onto the subject. This makes a configuration of the distance measuring camera larger. Further, since the constant pattern light projected onto the subject is generally light having a wavelength outside the visible light band, the pattern projection type distance measuring camera needs a special light source. Thus, the pattern projection type distance measuring camera is not suitable to be used for normal photographing.

RELATED ART DOCUMENT

Patent Document

JP 2013-190394A

Problems To Be Solved By The Invention

The present invention has been made in view of the problems of the conventional arts mentioned above. Accordingly, it is an object of the present invention to provide a distance measuring camera which can calculate a distance to a subject without using any parallel disparities among a plurality of images and without projecting constant pattern light onto the subject.

Means For Solving The Problems

The above object is achieved by the present inventions defined in the following (1) to (9).

A distance measuring camera, comprising:
a first optical system for collecting light from a subject to form a first subject image;
a second optical system for collecting the light from the subject to form a second subject image;
an imaging part for imaging the first subject image formed by the first optical system and the second subject image formed by the second optical system; and
a distance calculating part for calculating a distance to the subject based on the first subject image and the second subject image imaged by the imaging part,
wherein the distance calculating part calculates the distance to the subject based on an image magnification ratio between a magnification of the first subject image and a magnification of the second subject image.

(2) The distance measuring camera according to the above (1), wherein the first optical system is a fixed focus optical system and the second optical system is an autofocus optical system configured so that at least one lens constituting the second optical system can be actuated.

(3) The distance measuring camera according to the above (1) or (2), wherein the first optical system and the second optical system are configured so that a change of the magnification of the first subject image according to the distance to the subject is different from a change of the magnification of the second subject image according to the distance to the subject.

(4) The distance measuring camera according to the above (3), wherein the first optical system and the second optical system are configured so that a focal length of the first optical system and a focal length of the second optical system are different from each other, and thereby the change of the magnification of the first subject image according to the distance to the subject is different from the change of the magnification of the second subject image according to the distance to the subject.

(5) The distance measuring camera according to the above (3) or (4), wherein a depth disparity in an optical axis direction exists between a front principal point of the first optical system and a front principal point of the second optical system, and thereby the change of the magnification of the first subject image according to the distance to the subject is different from the change of the magnification of the second subject image according to the distance to the subject.

(6) The distance measuring camera according to any one of the above (1) to (5), further comprising an association information storage part storing association information for associating the image magnification ratio between the magnification of the first subject image and the magnification of the second subject image with the distance to the subject, wherein the distance calculating part calculates the distance to the subject based on the image magnification ratio between the magnification of the first subject image and the magnification of the second subject image and the association information in the association information storage part.

(7) The distance measuring camera according to any one of the above (1) to (6), wherein the distance calculating part calculates a ratio between a size of the first subject image and a size of the second subject image as the image magnification ratio between the magnification of the first subject image and the magnification of the second subject image.

(8) The distance measuring camera according to any one of the above (1) to (7), wherein the imaging part is a single image sensor for imaging both of the first subject image and the second subject image.

(9) The distance measuring camera according to the above (8), further comprising a first wavelength selection element provided on an optical path of the light for forming the first subject image to restrict a wavelength of the light forming the first subject image and a second wavelength selection element provided on an optical path of the light for forming the second subject image to restrict a wavelength of the light forming the second subject image, wherein a wavelength band of the light forming the first subject image which is restricted by the first wavelength selection element is different from a wavelength band of the light forming the second subject image which is restricted by the second wavelength selection element.

Effect Of The Invention

The distance measuring camera of the present invention uses the two optical systems configured so that the changes of the magnifications of the subject images according to the distance to the subject are different from each other and can measure the distance to the subject based on the image magnification ratio (the ratio of the magnifications) between the two subject images respectively formed by the two optical systems. Thus, in the distance measuring camera of the present invention, it is not necessary to ensure a large parallel disparity unlike the conventional stereo camera type distance measuring camera using parallel disparities among a plurality of images. Therefore, even if the two optical systems are arranged so as to be close to each other in the parallel direction perpendicular to the optical axis direction, it is possible to accurately calculate the distance to the subject. As a result, it is possible to reduce a size of the distance measuring camera compared with the conventional stereo camera type distance measuring camera. Further, according to the present invention, it becomes unnecessary to design the distance measuring camera with considering the parallel disparities. Thus, it is possible to enhance the flexibility of design for the distance measuring camera. Furthermore, since the distance measuring camera of the present invention does not use any parallel disparity to calculate the distance to the subject, it is possible to accurately calculate the distance to the subject even if the subject is located at a position very close to the distance measuring camera.

Further, in the distance measuring camera of the present invention, it is not necessary to use a special light source such as a projector for projecting constant pattern light onto the subject unlike the conventional pattern projection type distance measuring camera. Thus, it is possible to simplify a system configuration of the distance measuring camera. As a result, it is possible to realize downsizing, weight-saving, power-saving and cost-reduction of the distance measuring camera compared with the conventional pattern projection type distance measuring camera. Furthermore, since the distance measuring camera of the present invention does not need to use any special light source for irradiating light having a wavelength outside the visible range unlike the conventional pattern projection type distance measuring camera, the distance measuring camera of the present invention can also perform normal photographing.

BRIEF DESCRITION OF THE FIGURES

DETAILED DESCRIPTION

First, description will be given to a distance measuring principle for calculating a distance to a subject, which is used in a distance measuring camera of the present invention.

Figure 1:
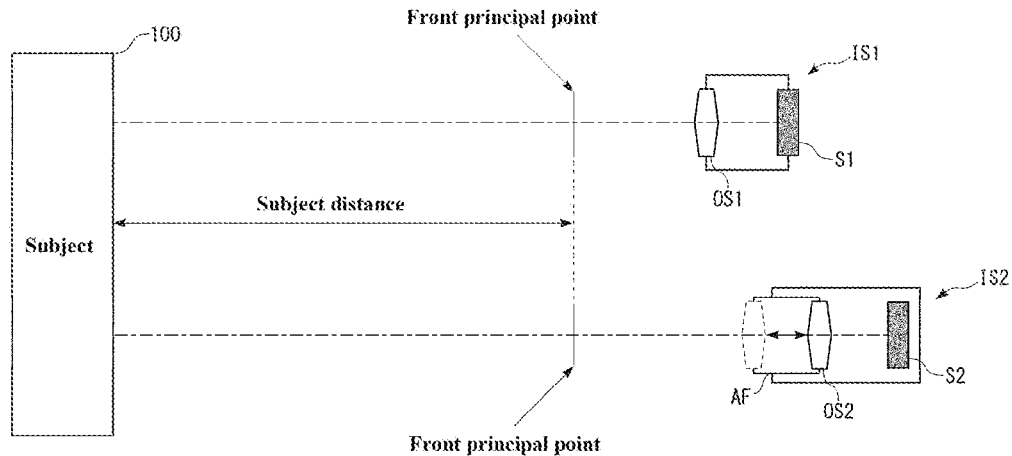
FIG. 1 is a view for explaining a distance measuring principle of a distance measuring camera of the present invention.

First, it is assumed that a subject 100 located at an infinite distance point is imaged by a first imaging system IS1 and a second imaging system IS2 as shown in FIG. 1. The first imaging system IS1 includes a first optical system OS1 for collecting light from the subject 100 to form a first subject image and a first image sensor S1 for imaging the first subject image formed by the first optical system OS1. The first optical system OS1 is a fixed focus system configured so that a focusing operation for the first optical system OS1 cannot be performed. Thus, the first imaging system IS1 is a fixed focus imaging system. A focusing position of the first imaging system IS1 is determined by a separation distance between the first optical system OS1 and the first image sensor S1 which is set at the time of configuring the first imaging system IS1. In the example shown in FIG. 1, the first optical system OS1 and the first image sensor S1 are configured and arranged so as to focus on the infinite distance point.

The second imaging system IS2 includes a second optical system OS2 for collecting the light from the subject 100 to form a second subject image, a lens actuator AF for performing a focusing operation (or an automatic focusing operation) for the second optical system OS2 by actuating at least one lens (such as a focusing lens) constituting the second optical system OS2 and a second image sensor S2 for imaging the second subject image formed by the second optical system OS2. The second optical system OS2 is an autofocus optical system configured so that the at least one lens (such as a focusing lens) constituting the second optical system OS2 can be actuated. Thus, the focusing operation for the second optical system OS2 can be performed by the lens actuator AF.

The second optical system OS2 and the second image sensor S2 are arranged so as to focus on the infinite distance point in an initial state that the lens actuator AF does not perform the focusing operation by actuating (moving) the at least one lens constituting the second optical system OS2. In the example shown in FIG. 1, the second imaging system IS2 focuses on the subject 100 located at the infinite distance point. Further, as is clear from FIG. 1, although an optical axis of the first optical system OS1 for the first image sensor S1 and an optical axis of the second optical system OS2 for the second image sensor S2 are parallel to each other, the optical axis of the first optical system OS1 for the first image sensor S1 and the optical axis of the second optical system OS2 for the second image sensor S2 do not coincide with each other. In the illustrated aspect, the first optical system OS1 is schematically illustrated as assuming that a rear principal point of the first optical system OS1 is located at a center position of the first optical system OS1 for the purpose of illustration. Similarly, the second optical system OS2 is schematically illustrated as assuming that a rear principal point of the second optical system OS2 is located at a center position of the second optical system OS2.

When the one subject 100 located at one subject distance is imaged by the first imaging system IS1 and the second imaging system IS2 as shown in FIG. 1, a distance from a front principal point of the first optical system OS1 to the subject 100 and a distance from a front principal point of the second optical system OS2 to the subject 100 are equal to each other regardless of focal lengths of the first optical system OS1 and the second optical system OS2 and the like.

When the subject 100 is located at the infinite distance point and each of the first imaging system IS1 and the second imaging system IS2 focuses on the infinite distance point as shown in FIG. 1, a distance from the rear principal point of the first optical system OS1 to an imaging surface of the first image sensor S1 is equal to the focal length "$f_1$" of the first optical system OS1 and a distance from the rear principal point of the second optical system OS2 to an imaging surface of the second image sensor S2 is equal to the focal length "$f_2$" of the second optical system OS2.

Figure 2:
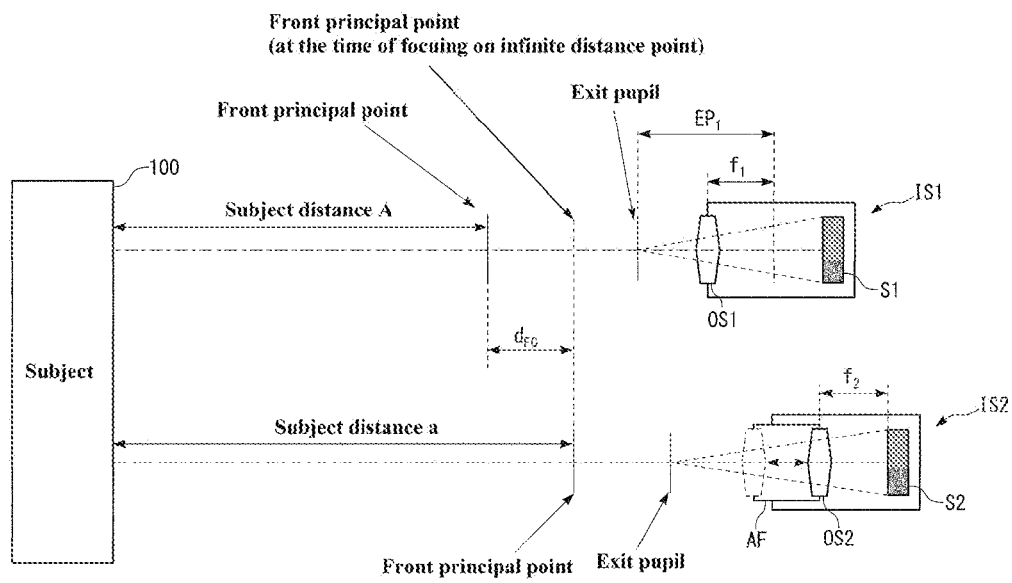
FIG. 2 is another view for explaining the distance measuring principle of the distance measuring camera of the present invention.

On the other hand, the fixed focus imaging system such as the first imaging system IS1 is often configured so as to focus on a predetermined arbitrary distance for effectively utilizing a depth of field thereof or imaging the subject 100 located at a desired distance. It is assumed that the first imaging system IS1 which is the fixed focus imaging system configured so as to focus on the arbitrary distance as described above and the second imaging system IS2 which is the autofocus imaging system configured so that the focusing operation (the automatic focusing operation) can be performed are used for imaging the subject 100 located at the infinite distance point. FIG. 2 shows an example in which the subject 100 located at the infinite distance point is imaged by the first imaging system IS1 configured so as to focus on the arbitrary distance and the second imaging system IS2.

Since the first imaging system IS1 is configured so as to focus on the predetermined distance in the state shown in FIG. 2, a position of the front principal point of the first imaging system IS1 is shifted from a position of the front principal point in the case of configuring the first imaging system IS1 so as to focus on the infinite distance point to the side of the subject 100 by a distance "$d_{FC}$". Further, the distance from the rear principal point of the first optical system OS1 to the imaging surface of the first image sensor S1 is longer than the focal length "$f_1$" of the first optical system OS1. Thus, in the state shown in FIG. 2, the first imaging system IS1 performs the imaging for the subject 100 in a defocus state. On the other hand, the second imaging system IS2 focuses on the infinite distance point. Thus, in the state shown in FIG. 2, the second imaging system IS2 performs the imaging for the subject 100 in an in-focus state. In this regard, "$EP_1$" in FIG. 2 is a distance from an exit pupil of the first optical system OS1 to an image formation position of the first subject image of the subject 100 located at the infinite distance point.

In this case, a distance (subject distance) "A" from the front principal point of the first optical system OS1 to the subject 100 and a distance (subject distance) "a" from the front principal point of the second optical system OS2 to the subject 100 do not coincide with each other even though the one subject 100 is imaged. A relationship between the two distances "A" and "a" can be expressed by the following equation (1).

[Equation 1]

$$A = a - d_{FC} \qquad (1)$$

Figure 3:
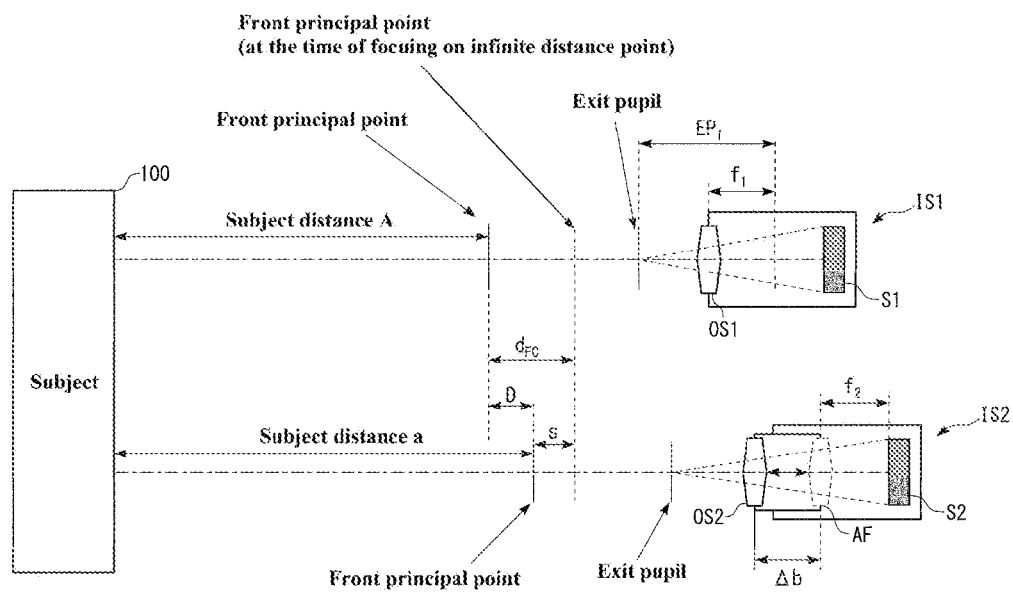
FIG. 3 is yet another view for explaining the distance measuring principle of the distance measuring camera of the present invention.

Next, it is assumed that the subject 100 located apart from the front principal point of the first optical system OS1 by the distance "A" (apart from the front principal point of the second optical system OS2 by the distance "a") is imaged by the first imaging system IS1 configured so as to focus on the arbitrary distance and the second imaging system IS2. FIG. 3 shows an example in which the subject 100 located apart from the front principal point of the first optical system OS1 by the distance "A" (apart from the front principal point of the second optical system OS2 by the distance "a") is imaged by the first imaging system IS1 configured so as to focus on the arbitrary distance and the second imaging system IS2.

In this case, when the subject 100 is not located at an in-focus distance of the first imaging system IS1, the first imaging system IS1 performs the imaging for the subject 100 in the defocus state. On the other hand, in the second imaging system IS2, the at least one lens constituting the second optical system OS2 is moved toward the side of the subject 100 by a shift amount "Δb" by the lens actuator AF to perform the focusing operation (the automatic focusing operation) for the second optical system OS2. Thus, the second imaging system IS2 performs the imaging for the subject 100 in the in-focus state. In this regard, at the time of performing the focusing operation for the second optical system OS2 by moving the at least one lens constituting the second optical system OS2 to the side of the subject 100 with the lens actuator AF, the position of the front principal point of the second optical system OS2 is shifted to the side of the subject 100 by a shift amount "s". Thus, the distance from the front principal point of the second optical system OS2 to the subject 100 decreases by the shift amount "s" compared with that before the focusing operation for the second optical system OS2 is performed. As described above, although the distance from the front principal point of the second optical system OS2 to the subject 100 changes by the shift amount "s" due to the focusing operation for the second optical system OS2, the distance from the front principal point of the second optical system OS2 to the subject 100 is fixed once the focusing operation for the second optical system OS2 is performed to focus on the subject 100.

The shift amount "s" of the position of the front principal point of the second optical system OS2 and the shift amount "Δb" of the at least one lens constituting the second optical system OS2 are determined by a relationship between the position of the subject 100 and the focal length "$f_2$" of the second optical system OS2. In this regard, "D" in FIG. 3 is a depth disparity in the optical axis direction between the front principal point of the first optical system OS1 and the front principal point of the second optical system OS2.

Similar to the case shown in FIG. 2, the distance "A" from the front principal point of the first optical system OS1 to the subject 100 and the distance "a" from the front principal point of the second optical system OS2 to the subject 100 do not coincide with each other even though the one subject 100 is imaged in this case. A relationship between the two distances "A" and "a" can be expressed by the following equation (2).

[Equation 2]

$$A = a + s - d_{FC} \quad (2)$$

Further, the shift amount of the position of the front principal point of the first imaging system IS1 changes due to other factors than the adjustment of the in-focus distance of the first imaging system IS1 by changing the distance between the first optical system OS1 and the first image sensor S1, for example, due to a change of the position of the first imaging system IS1. In a case of considering the other factors than the adjustment of the in-focus distance of the first imaging system IS1 by changing the distance between the first optical system OS1 and the first image sensor S1, the above equation (2) can be expressed by the following equation (3).

[Equation 3]

$$A = a + s - d_{all}$$

$$\text{where } d_{all} = d_{FC} + d_p \quad (3)$$

Here, "$d_{FC}$" is the shift amount of the position of the front principal point of the first optical system OS1 caused by the adjustment of the in-focus distance of the first imaging system IS1 by changing the distance between the first optical system OS1 and the first image sensor S1, "$d_p$" is the shift amount of the position of the front principal point of the first optical system OS1 caused by the other factors than the adjustment of the in-focus distance of the first imaging system IS1 and "$d_{all}$" is a total amount of the shift amounts of the position of the front principal point of the first optical system OS1 and can be expressed by "$d_{all}$"="$d_{FC}$"+"$d_p$".

On the other hand, the shift amount "s" of the front principal point of the second optical system OS2 of the second imaging system IS2 can be expressed by the following equation (4) derived from the lens equation.

[Equation 4]

$$s = \left(\frac{1}{f_2} - \frac{1}{a}\right)^{-1} - f_2 = \frac{-f_2^2}{f_2 - a} \quad (4)$$

Since the first optical system OS1 is the fixed focus optical system, the in-focus distance of the first imaging system IS1 is fixed at the time of configuring the first imaging system IS1. Thus, unless the subject 100 is located at the in-focus distance of the first imaging system IS1, the first imaging system IS1 performs the imaging for the subject 100 in the defocus state.

Figure 4:
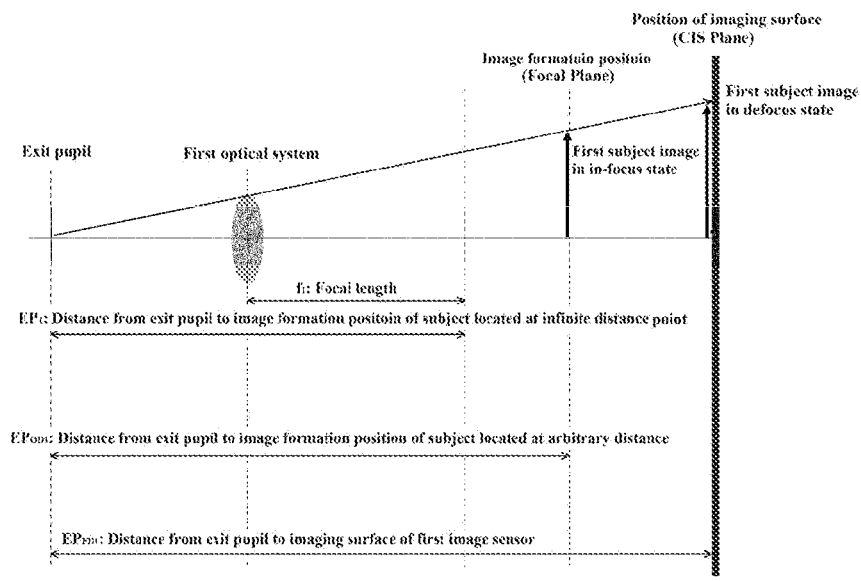
FIG. 4 is a view for explaining a relationship between a magnification of a first subject image imaged in a defocus state and a magnification of the first subject image imaged in an in-focus state.

A magnification "$M_1$" of the first subject image of the subject 100 imaged in the above-described defocus state is different from a magnification "$m_1$" of the first subject image of the subject 100 imaged in the in-focus state. FIG. 4 shows a view for explaining a relationship between the magnification "$M_1$" of the first subject image of the subject 100 imaged in the defocus state and the magnification "$m_1$" of the first subject image of the subject 100 imaged in the in-focus state.

In FIG. 4, the focal length "$f_1$" of the first optical system OS1, a distance "$EP_1$" from the exit pupil of the first optical system OS1 to the image formation position of the first subject image when the subject 100 is located at the infinite distance point, a distance "$EP_{OD1}$" from the exit pupil of the first optical system OS1 to an image formation position of the first subject image when the subject 100 is located at the distance "A" and a distance "$EP_{FD1}$" from the exit pupil of the first optical system OS1 to the imaging surface of the first image sensor S1 are illustrated.

The first subject image of the subject 100 located apart from the front principal point of the first optical system OS1 by the distance "A" (apart from the front principal point of the second optical system OS2 by the distance "a") takes the in-focus state at the image formation position (Focal Plane) shown in FIG. 4 and takes the defocus state at other positions, for example, on the imaging surface of the first image sensor S1. A ratio between a size of the first subject image in the in-focus state and a size of the first subject image in the defocus state can be obtained as "$EP_{FD1}$"/"$EP_{OD1}$" from a similarity relationship of two right-angled triangles each having one vertex at the exit pupil shown in FIG. 4. Since a ratio between the magnification "$M_1$" of the first subject image of the subject 100 imaged in the defocus state and the magnification "$m_1$" of the first subject image of the subject 100 imaged in the in-focus state can be also expressed as "$EP_{FD1}$"/"$EP_{OD1}$", the magnification "$M_1$" of the first subject image of the subject 100 imaged in the defocus state can be expressed by the following equation (5).

[Equation 5]
$$M_1 = m_1 \times \frac{EP_{FD1}}{EP_{OD1}} \tag{5}$$

Further, the magnification "$m_1$" of the first subject image of the subject 100 imaged in the in-focus state can be expressed by the following equation (6) derived from the lens equation.

[Equation 6]
$$m_1 = \frac{\left(\frac{1}{f_1} - \frac{1}{A}\right)^{-1}}{A} = \frac{f_1}{A - f_1} \tag{6}$$

Further, the distance from the rear principal point of the first optical system OS1 to the imaging surface of the first image sensor S1 can be expressed by "$(1/f_1 - 1/FC_1)^{-1}$" derived from the lens equation. Here, "$FC_1$" is an arbitrary subject distance (focus adjusted distance) used at the time of adjusting the in-focus distance of the first imaging system IS1. Namely, when the subject 100 is located apart from the front principal point of the first optical system OS1 by the distance "$FC_1$", the first subject image in the in-focus state is formed on the imaging surface of the first image sensor S1. Thus, the distance "$EP_{FD1}$" from the exit pupil of the first optical system OS1 to the imaging surface of the first image sensor S1 can be expressed by the following equation (7) derived from the positional relationship shown in FIG. 4.

[Equation 7]
$$EP_{FD1} = EP_1 + \left(\frac{1}{f_1} - \frac{1}{FC_1}\right)^{-1} - f_1 = EP_1 + \frac{f_1^2}{FC_1 - f_1} \tag{7}$$

Further, the distance from the rear principal point of the first optical system OS1 to the image formation position of the first subject image of the subject 100 can be expressed as "$(1/f_1 - 1/A)^{-1}$" derived from the lens equation. Thus, the distance "$EP_{OD1}$" from the exit pupil of the first optical system OS1 to the image formation position of the first subject image when the subject 100 is located at the distance A can be expressed by the following equation (8) derived from the positional relationship shown in FIG. 4.

[Equation 8]
$$EP_{OD1} = EP_1 + \left(\frac{1}{f_1} - \frac{1}{A}\right)^{-1} - f_1 = EP_1 + \frac{f_1^2}{A - f_1} \tag{8}$$

Further, by modifying the above equation (5) for the magnification "$M_1$" of the first subject image imaged in the defocus state with the above equations (6) to (8), the following equation (9) can be derived.

[Equation 9]
$$M_1 = \frac{f_1 \cdot \{EP_1 \cdot (FC_1 - f_1) + f_1^2\}}{(FC_1 - f_1) \cdot \{EP_1 \cdot (A - f_1) + f_1^2\}} \tag{9}$$

Referring back to FIG. 3, discussion will be given to a magnification "$M_2$" of the second subject image formed by the second optical system OS2. As described above, the second optical system OS2 of the second imaging system IS2 is the autofocus optical system and the lens actuator AF can perform the focusing operation for the second optical system OS2. Thus, when the second imaging system IS2 images the subject 100 located apart from the front principal point of the second optical system OS2 by the distance "a", the lens actuator AF performs the focus operation for the second optical system OS2 for allowing the second imaging system IS2 to focus on the subject 100 located at the distance "a". As described above, since the second imaging system IS2 is the autofocus imaging system, the second imaging system IS2 images the subject 100 located apart from the front principal point of the second optical system OS2 by the distance "a" in the in-focus state.

The magnification "$M_2$" of the second subject image of the subject 100 imaged in the in-focus state can be expressed by the following equation (10) derived from the lens equation.

[Equation 10]
$$M_2 = \frac{\left(\frac{1}{f_2} - \frac{1}{a}\right)^{-1}}{a} = \frac{-f^2}{f_2 - a} \tag{10}$$

Thus, an image magnification ratio "MR" between the magnification "$M_1$" of the first subject image formed on the imaging surface of the first image sensor S1 by the first optical system OS1 and the magnification "$M_2$" of the second subject image formed on the imaging surface of the second image sensor S2 by the second optical system OS2 can be expressed by the following equation (11).

[Equation 11]
$$MR = \frac{M_1}{M_2} = \frac{\frac{f_1 \cdot \{EP_1 \cdot (FC_1 - f_1) + f_1^2\}}{(FC_1 - f_1) \cdot \{EP_1 \cdot (A - f_1) + f_1^2\}}}{\frac{-f_2}{f_2 - a}} \tag{11}$$

Further, by substituting the following relational equations (12) to (14) into the above equation (11), the following equation (15) for the image magnification ratio "MR" can be obtained.

[Equation 12]
$$K = f_1 \cdot \{EP_1 \cdot (FC_1 - f_1) + f_1^2\} \tag{12}$$

-continued

[Equation 13]

$$Z = EP_1 \cdot (FC_1 - f_1) \tag{13}$$

[Equation 14]

$$W = -f_1 \cdot EP_1 \cdot (FC_1 - f_1) + f_1^2 \cdot (FC_1 - f_1) \tag{14}$$

[Equation 15]

$$MR = \frac{M_1}{M_2} = \frac{\frac{K}{A \cdot Z + W}}{\frac{-f_2}{f_2 - a}} \tag{15}$$

Further, by substituting the relational equation "$A = a + s - d_{all}$" for the distance "A" from the front principal point of the first optical system OS1 to the subject 100 expressed by the above equation (3) into the above equation (15), the following equation (16) for the image magnification ratio "MR" can be obtained.

[Equation 16]

$$MR = \frac{K \cdot (f_2 - a)}{-f_2 \cdot \{(a + s - d_{all}) \cdot Z + W\}} \tag{16}$$

Here, the following equation (17) for the distance "a" from the front principal point of the second optical system OS2 to the subject 100 can be obtained from the above equation (16).

[Equation 17]

$$a = \frac{-\{MR \cdot Z \cdot f_2 \cdot s + (-MR \cdot Z \cdot d_{all} + MR \cdot W + K) \cdot f_2\}}{MR \cdot Z \cdot f_2 - K} \tag{17}$$

Further, by substituting the following relational equations (18) and (19) into the above equation (17), the following equation (20) for the distance "a" from the front principal point of the second optical system OS2 to the subject 100 can be obtained.

[Equation 18]

$$X = MR \cdot Z \cdot f_2 \tag{18}$$

[Equation 19]

$$Y = MR \cdot W \cdot f_2 \tag{19}$$

[Equation 20]

$$a = \frac{-(X \cdot s + K \cdot f_2 - X \cdot d_{all} + Y)}{X - K} \tag{20}$$

Further, by substituting the relational equation "$s = -f_2^2/f_2 - a)$" for the shift amount "s" of the front principal point of the second optical system OS2 expressed by the above equation (4) into the above equation (20), the following equation (21) for the distance "a" from the front principal point of the second optical system OS2 to the subject 100 can be obtained.

[Equation 21]

$$a = \frac{\{(X - K) \cdot f_2^2 + (X \cdot d_{all} + K \cdot a - Y) \cdot f_2 - X \cdot a \cdot d_{all} + Y \cdot a\}}{\{(X - K) \cdot f_2 - X \cdot a + K \cdot a\}} \tag{21}$$

Further, by modifying the above equation (21) for the distance "a", the following quadratic equation (22) for the distance "a" can be obtained.

[Equation 22]

$$(K-X) \cdot a^2 + \{(X-2K) \cdot f_2 + X \cdot d_{all} - Y\} \cdot a + (K-X) \cdot f_2^2 + (-X \cdot d_{all} + Y) \cdot f_2 = 0 \tag{22}$$

By solving the above quadratic equation (22), two solutions for the distance "a" which are respectively expressed by the following general equations (23) and (24) can be obtained.

[Equation 23]

$$a = \frac{\sqrt{\begin{array}{c}(4K \cdot X - 3X^2) \cdot f_2^2 + (2X \cdot Y - 2X^2 \cdot d_{all}) \cdot \\ f_2 + X^2 \cdot d_{all}^2 - 2X \cdot Y \cdot d_{all} + Y^2 +\end{array}} (X - 2K) \cdot f_2 + X \cdot d_{all} - Y}{2X - 2K} \tag{23}$$

[Equation 24]

$$a = -\frac{\sqrt{\begin{array}{c}(4K \cdot X - 3X^2) \cdot f_2^2 + (2X \cdot Y - 2X^2 \cdot d_{all}) \cdot \\ f_2 + X^2 \cdot d_{all}^2 - 2X \cdot Y \cdot d_{all} + Y^2 +\end{array}} (2K - X) \cdot f_2 - X \cdot d_{all} + Y}{2X - 2K} \tag{24}$$

It is determined by a method described later that which solution of the two solutions for the distance "a" which are respectively expressed by the above general equations (23) and (24) is proper for the distance "a".

First, in a case that the solution expressed by the above general equation (23) and the solution expressed by the above general equation (24) are positive values and equal to each other, both of the solutions are proper for the distance "a". On the other hand, in a case that the solution expressed by the above general equation (23) and the solution expressed by the above general equation (24) do not coincide with each other, it is determined by the following steps that which solution of the two solutions for the distance "a" which are respectively expressed by the above general equations (23) and (24) is proper for the distance "a".

First, the magnification "$M_1$" of the first subject image and the magnification "$M_2$" of the second subject image are calculated with the solution obtained by the above general equation (23). Next, the size of the first subject image and the size of the second subject image are calculated from the magnification "$M_1$" of the first subject image and the magnification "$M_2$" of the second subject image calculated with the solution obtained by the above general equation (23). Further, a difference "$\Delta Sz1$" (hereinafter, referred to as "a first size difference $\Delta Sz1$") between the size of the first subject image and the size of the second subject image obtained in this step is obtained.

Next, the magnification "$M_1$" of the first subject image and the magnification "$M_2$" of the second subject image are calculated with the solution obtained by the above general equation (24). Next, the size of the first subject image and the size of the second subject image are calculated from the magnification "$M_1$" of the first subject image and the magnification "$M_2$" of the second subject image calculated with the solution obtained by the above general equation (24). Further, a difference "$\Delta Sz2$" (hereinafter, referred to as "a second size difference $\Delta Sz2$") between the size of the first subject image and the size of the second subject image obtained in this step is obtained.

On the other hand, an actual size "$Sz_1$" of the first subject image and an actual size "$Sz_2$" of the second subject image can be calculated from an image signal for the first subject image and an image signal of the second subject image respectively obtained by imaging the first subject image and the second subject image with the first image sensor S1 and the second image sensor S2 as described late. Thus, the actual size "$Sz_1$" of the first subject image and the actual size "$Sz_2$" of the second subject image are obtained from the image signal of the first subject image and the image signal of the second subject image to obtain a difference "$\Delta Sz3$" (hereinafter, referred to as "an actual size difference $\Delta Sz3$") between the actual size "$Sz_1$" of the first subject image and the actual size "$Sz_2$" of the second subject image.

The difference (one of the first size difference "$\Delta Sz1$" and the second size difference "$\Delta Sz2$") between the size of the first subject image and the size of the second subject image calculated with proper one of the two solutions for the distance "a" which are respectively expressed by the above general equations (23) and (24) is equal to the difference "$\Delta Sz3$" (the actual size difference "$\Delta Sz3$") between the actual size "$Sz_1$" of the first subject image and the actual size "$Sz_2$" of the second subject image calculated from the image signal of the first subject image and the image signal of the second subject image.

On the other hand, the difference (the other one of the first size difference "$\Delta Sz1$" and the second size difference "$\Delta Sz2$") between the size of the first subject image and the size of the second subject image calculated with improper one of the two solutions for the distance "a" which are respectively expressed by the above general equations (23) and (24) does not coincide with the difference "$\Delta Sz3$" (the actual size difference "$\Delta Sz3$") between the actual size "$Sz_1$" of the first subject image and the actual size "$Sz_2$" of the second subject image calculated from the image signal of the first subject image and the image signal of the second subject image.

Thus, in the case that the first size difference "$\Delta Sz1$" and the second size difference "$\Delta Sz2$" are compared with the actual size difference "$\Delta Sz3$" and the first size difference "$\Delta Sz1$" and the actual size difference "$\Delta Sz3$" coincide with each other ("$\Delta Sz1$"="$\Delta Sz3$"), the solution expressed by the above general equation (23) is proper for the distance "a". On the other hand, in the case that the first size difference "$\Delta Sz1$" and the second size difference "$\Delta Sz2$" are compared with the actual size difference "$\Delta Sz3$" and the second size difference "$\Delta Sz2$" and the actual size difference "$\Delta Sz3$" coincide with each other ("$\Delta Sz2$"="$\Delta Sz3$"), the solution expressed by the above general equation (24) is proper for the distance "a". In the present invention, it is determined by the above-described method that which solution of the two solutions respectively expressed by the above general equations (23) and (24) is proper for the distance "a".

Further, among the coefficients "$f_2$", "K", "$d_{all}$", "X" and "Y" in the above general equations (23) and (24), the focal length "$f_2$" of the second optical system OS2 is a fixed value. The total amount "$d_{all}$" of the shift amounts of the front principal point of the first optical system OS1 is a fixed value determined at the time of configuring and arranging the first optical system OS1.

As is clear from the above equation (12) of "$K=f_1 \cdot \{EP_1 \cdot (FC_1-f_1)+f_1^2\}$", the coefficient "K" is obtained from fixed values determined at the time of configuring and arranging the first optical system OS1, that is from the focal length "$f_1$" of the first optical system OS1, the distance "$EP_1$" from the exit pupil of the first optical system OS1 to the image formation position of the first subject image when the subject 100 is located at the infinite distance point and the distance "$FC_1$" from the front principal point of the first optical system OS1 to the subject 100 when the first subject image takes the in-focus state on the imaging surface of the first image sensor S1. Thus, the coefficient "K" is a fixed value.

On the other hand, as is clear from the above equation (18) of "$X=MR \cdot Z \cdot f_2$", the coefficient "X" is obtained from the image magnification ratio "MR", the coefficient "Z" expressed by the above equation (13) of "$Z=EP_1 \cdot (FC_1-f_1)$" and the focal length $f_2$ of the second optical system OS2. The focal length "$f_2$" of the second optical system OS2 is the fixed value determined at the time of configuring the second optical system OS2. Further, since "$EP_1$", "$FC_1$" and "$f_1$" for calculating the coefficient "Z" are the fixed values determined at the time of configuring and arranging the first optical system OS1, the coefficient "Z" is a fixed value. Thus, if the image magnification ratio "MR" is obtained, the coefficient "X" can be obtained.

Similarly, as is clear from the above equation (19) of "$Y=MR \cdot W \cdot f_2$", the coefficient "Y" is obtained from the image magnification ratio "MR", the coefficient "W" expressed by the above equation (14) of "$W=-f_1 \cdot EP_1 \cdot (FC_1-f_1)+f_1^2 \cdot (FC_1-f_1)$" and the focal length "$f_2$" of the second optical system OS2. The focal length "$f_2$" of the second optical system OS2 is the fixed value determined at the time of configuring the second optical system OS2. "$EP_1$", "$FC_1$" and "$f_1$" for calculating the coefficient "W" are the fixed values determined at the time of configuring and arranging the first optical system OS1, the coefficient "W" is a fixed value. Thus, if the image magnification ratio "MR" is obtained, the coefficient "Y" can be obtained.

Thus, if the magnification ratio "MR" ($="M_1"/"M_2"$) between the magnification "$M_1$" of the first subject image formed on the imaging surface of the first image sensor S1 by the first optical system OS1 and the magnification "$M_2$" of the second subject image formed on the imaging surface of the second image sensor S2 by the second optical system OS2 is obtained, it is possible to calculate the distance "a" from the front principal point of the second optical system OS2 to the subject 100 with the above general equation (23) or (24).

Figure 5:
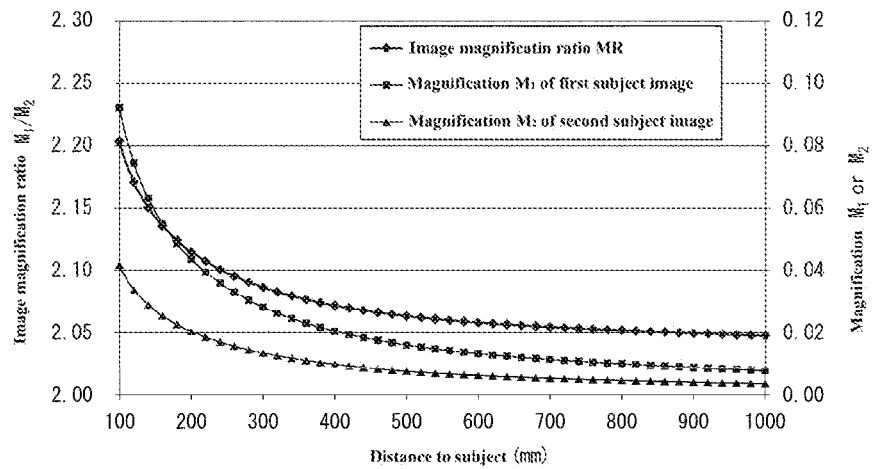
FIG. 5 is a graph for explaining that an image magnification ratio between the magnification of the first subject image formed by a first optical system shown in FIG. 3 and a magnification of a second subject image formed by a second optical system shown in FIG. 2 change according to a distance to a subject.

FIG. 5 shows one example of the relationship among the magnification "$M_1$" of the first subject image formed on the imaging surface of the first image sensor S1 by the first optical system OS1, the magnification "$M_2$" of the second subject image formed on the imaging surface of the second image sensor S2 by the second optical system OS2, the image magnification ratio "MR" between the magnification "$M_1$" of the first subject image and the magnification "$M_2$" of the second subject image and the distance "a" to the subject 100, which are calculated from the above general equations (23) and (24). Since a value of the image magnification ratio "MR" changes according to the distance "a" to the subject 100 as is clear from FIG. 5, it is possible to identify the distance "a" to the subject 100 based on the image magnification ratio "MR".

On the other hand, the image magnification ratio "MR" can be calculated by the following equation (25). In the following equation (25), "sz" is a size (height or width) of the subject 100, "$Sz_1$" is the actual size (image height or image width) of the first subject image formed on the imaging surface of the first image sensor S1 by the first optical system OS1 and "$Sz_2$" is the actual size (image height or image width) of the second subject image formed on the imaging surface of the second image sensor S2 by the second optical system OS2.

[Equation 25]

$$MR = \frac{M_1}{M_2} = \frac{Sz_1/sz}{Sz_2/sz} = \frac{Sz_1}{Sz_2} \qquad (25)$$

The actual size "$Sz_1$" of the first subject image and the actual size "$Sz_2$" of the second subject image can be calculated from the image signal of the first subject image and the image signal of the second subject image respectively obtained by imaging the first subject image and the second subject image with the first image sensor S1 and the second image sensor S2. Thus, by actually measuring the actual size "$Sz_1$" of the first subject image and the actual size "$Sz_2$" of the second subject image from the image signal of the first subject image and the image signal of the second subject image respectively obtained by actually imaging the subject 100 with the first imaging system IS1 and the second imaging system IS2, it is possible to obtain the image magnification ratio "MR" between the magnification "$M_1$" of the first subject image and the magnification "$M_2$" of the second subject image based on the actual size "$Sz_1$" of the first subject image and the actual size "$Sz_2$" of the second subject image.

According to the above-described distance measuring principal, the distance measuring camera of the present invention can calculate the image magnification ratio "MR" between the magnification "$M_1$" of the first subject image and the magnification "$M_2$" of the second subject image based on the actual size "$Sz_1$" of the first subject image and the actual size "$Sz_2$" of the second subject image which are actually measured and calculate the distance "a" to the subject 100 with the calculated image magnification ratio "MR".

In this regard, as is clear from the above equations (11) and (16) relating to the image magnification ratio "MR", if the focal length "$f_1$" of the first optical system OS1 is equal to the focal length "$f_2$" of the second optical system OS2 ("$f_1$"="$f_2$") and the difference "D" in the depth direction (the optical axis direction) does not exist between the front principal point of the first optical system OS1 and the front principal point of the second optical system OS2 ("D"=0, namely, the total amount "$d_{all}$" of the shift amounts of the front principal point of the first optical system OS1 is equal to the shift amount "s" of the front principal point of the second optical system OS2 ("$d_{all}$"="s") and the distance "A" from the front principal point of the first optical system OS1 to the subject 100 is equal to the distance "a" from the front principal point of the second optical system OS2 to the subject 100 ("A"="a")), the image magnification ratio "MR" is not established as a function of the distance "a" and the image magnification ratio "MR" becomes a constant value. In this case, the change of the magnification "$M_1$" of the first subject image according to the distance "a" to the subject 100 becomes the same as the change of the magnification "$M_2$" of the second subject image according to the distance "a" to the subject 100 and thus it becomes impossible to calculate the distance "a" to the subject 100 based on the image magnification ratio "MR".

Thus, in the distance measuring camera of the present invention, the first optical system OS1 and the second optical system OS2 are configured and arranged so as to satisfy at least one of the following first and second conditions for establishing the image magnification ratio "MR" as the function of the distance "a", and thereby the change of the magnification "$M_1$" of the first subject image according to the distance "a" to the subject 100 becomes different from the change of the magnification "$M_2$" of the second subject image according to the distance "a" to the subject 100.

(First Condition) The focal length "$f_1$" of the first optical system OS1 and the focal length "$f_2$" of the second optical system OS2 are different from each other ("$f_1$"≠"$f_2$").

(Second Condition) The depth disparity "D" in the optical axis direction exists between the front principal point of the first optical system OS1 and the front principal point of the second optical system OS2 ("D"≠0).

Thus, by calculating the image magnification ratio "MR" from the actual size "$Sz_1$" of the first subject image and the actual size "$Sz_2$" of the second subject image actually measured from the image signal of the first subject image and the image signal of the second subject image obtained by the distance measuring camera of the present invention, it is possible to calculate the distance "a" from the front principal point of the second optical system OS2 to the subject 100. Further, by using the above equation (3), it is also possible to calculate the distance "A" from the front principal point of the first optical system OS1 to the subject 100 from the distance "a" from the front principal point of the second optical system OS2 to the subject 100.

Hereinafter, description will be given to the distance measuring camera which can calculate the distance "a" from the front principal point of the second optical system OS2 to the subject 100 (and the distance "A" from the front principal point of the first optical system OS1 to the subject 100) by utilizing the above-described distance measuring principle based on the preferred embodiments illustrated in the accompanying drawings.

First Embodiment

Figure 6:
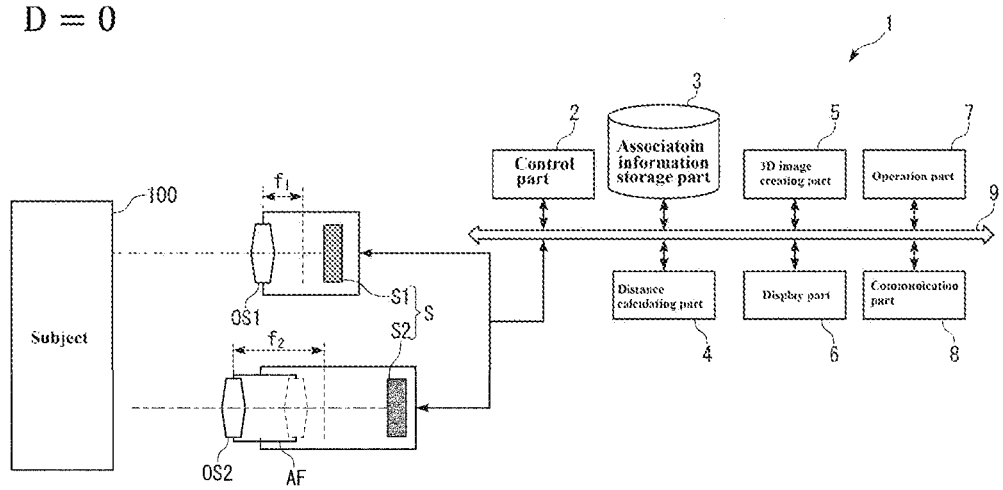
FIG. 6 is a block diagram schematically showing a distance measuring camera according to a first embodiment of the present invention.

First, a distance measuring camera according to a first embodiment of the present invention will be described with reference to FIG. 6. FIG. 6 is a block diagram schematically showing the distance measuring camera according to the first embodiment of the present invention.

A distance measuring camera 1 shown in FIG. 6 includes a control part 2 for performing control of the distance measuring camera 1, a first optical system OS1 for collecting light from a subject 100 to form a first subject image, a second optical system OS2 for collecting the light from the subject 100 to form a second subject image, a lens actuator AF for performing a focusing operation (or an automatic focusing operation) for the second optical system OS2, an imaging part S for imaging the first subject image formed by the first optical system OS1 and the second subject image formed by the second optical system OS2, an association information storage part 3 storing association information for associating an image magnification ratio "MR" between a magnification "$M_1$" of the first subject image and a magnification "$M_2$" of the second subject image with a distance "a" to the subject 100, a distance calculating part 4 for calculating the distance "a" to the subject 100 based on the first subject image and the second subject image imaged by the imaging part S, a three-dimensional image (3D) creating part 5 for creating a three-dimensional image of the subject 100 based on the first subject image or the second subject image imaged by the imaging part S and the distance "a" to the subject 100 calculated by the distance calculating part 4, a display part 6 such as a liquid crystal panel for displaying arbitrary information, an operation part 7 for inputting an operation from a user, a communication part 8 for performing communication with external devices and a data bus 9 for transmitting and receiving data between the components of the distance measuring camera 1.

In this regard, the configurations of the first optical system OS1 and the second optical system OS2 in the present embodiment are merely illustrative examples and the present invention is not limited thereto. Each of the first optical system OS1 and the second optical system OS2 may take any aspect as long as the first optical system OS1 and the second optical system OS2 are configured and arranged so as to satisfy at least one of the first condition and the second condition described above, and thereby the change of the magnification "$M_1$" of the first subject image with respect to the distance "a" to the subject 100 is different from the change of the magnification "$M_2$" of the second subject image with respect to the distance "a" to the subject 100. However, the distance measuring camera 1 according to the present embodiment is characterized in that the first optical system OS1 and the second optical system OS2 are configured so as to satisfy the first condition that the focal length "$f_1$" of the first optical system OS1 and the focal length "$f_2$" of the second optical system OS2 are different from each other ("$f_1$"≠"$f_2$") among the first condition and the second condition required for calculating the distance "a" to the subject 100 based on the image magnification ratio "MR". On the other hand, in the present embodiment, the first optical system OS1 and the second optical system OS2 are configured and arranged so as not to satisfy the above-described second condition ("D"≠0).

The distance measuring camera 1 of the present invention images the subject 100 with the imaging part S to calculate the image magnification ratio "MR" between the magnification "$M_1$" of the first subject image and the magnification "$M_2$" of the second subject image and uses the above general equation (23) or (24) to calculate the distance "a" from the front principal point of the second optical system OS2 to the subject 100. Further, if necessary, the distance measuring camera 1 of the present invention uses the above equation (3) to calculate the distance "A" from the front principal point of the first optical system OS1 to the subject 100 from the distance "a" from the front principal point of the second optical system OS2 to the subject 100.

Hereinafter, each component of the distance measuring camera 1 will be described in detail. The control part 2 transmits and receives various data and/or various instructions among the components through the data bus 9 to perform the control of the distance measuring camera 1. The control part 2 includes a processor for performing operational processes and a memory storing data, programs, modules and the like required for performing the control of the distance measuring camera 1. The processor of the control part 2 uses the data, the programs, the modules and the like stored in the memory to perform the control of the distance measuring camera 1. Further, the processor of the control part 2 can provide desired functions by using each component of the distance measuring camera 1. For example, the processor of the control part 2 can use the distance calculating part 4 to perform a process for calculating the distance "a" to the subject 100 based on the first subject image and the second subject image imaged by the imaging part S.

For example, the processor of the control part 2 is one or more operation parts such as microprocessors, microcomputers, microcontrollers, digital signal processors (DSPs), central processing units (CPUs), memory control units (MCUs), graphic processing units (GPUs), state machines, logic circuitries, application specific integrated circuits (ASICs) and combinations thereof that can perform operational processes for manipulating signals or the like based on computer-readable instructions. Among other capabilities, the processor of the control part 2 is configured to fetch computer-readable instructions (such as data, programs and modules) stored in the memory of the control part 2 and perform control and signal manipulation.

The memory of the control part 2 is one or more removable or non-removable computer-readable media including volatile memories (such as RAMs, SRAMs and DRAMs), non-volatile memories (such as ROM, EPROMs, flash memories, hard disks, optical discs, CD-ROMs, digital versatile discs (DVDs), magnetic cassettes, magnetic tapes and magnetic disks) and combinations thereof.

The first optical system OS1 has a function of collecting the light from the subject 100 to form the first subject image on an imaging surface of a first image sensor S1 of the imaging part S. The second optical system OS2 has a function of collecting the light from the subject 100 to form the second subject image on an imaging surface of a second image sensor S2 of the imaging part S. Each of the first optical system OS1 and the second optical system OS2 is constituted of one or more lenses and one or more optical elements such as an aperture. Further, as shown in the drawing, although an optical axis of the first optical system OS1 and an optical axis of the second optical system OS2 are parallel to each other, the optical axis of the first optical system OS1 and the optical axis of the second optical system OS2 do not coincide with each other.

Further, the first optical system OS1 is a fixed focus optical system. Thus, the one or more lenses constituting the first optical system OS1 are configured not to be actuated for an focusing operation. On the other hand, the second optical system OS2 is an autofocus optical system. Thus, at least one lens (such as a focusing lens) constituting the second optical system OS2 is configured to be actuated (moved) in an optical axis direction thereof by the lens actuator AF.

As described above, the first optical system OS1 and the second optical system OS2 are configured so that the focal length "$f_1$" of the first optical system OS1 and the focal length "$f_2$" of the second optical system OS2 are different from each other ("$f_1$"≠"$f_2$"). Thereby, a change of the magnification "$M_1$" of the first subject image formed by the first optical system OS1 according to the distance to the subject 100 is different from a change of the magnification "$M_2$" of the second subject image formed by the second optical system OS2 according to the distance to the subject 100.

The lens actuator AF has a function of actuating (moving) the at least one lens (such as a focusing lens) constituting the second optical system OS2 in the optical axis direction thereof in accordance with the control from the processor of the control part 2 to perform the focusing operation (or the automatic focusing operation) for the second optical system OS2. The lens actuator AF is not particularly limited to a specific kind as long as it can perform the focusing operation for the second optical system OS2 in accordance with the control from the processor of the control part 2. For example, the lens actuator AF can be constituted of an actuator such as a DC motor, a stepping motor and a voice coil motor.

In this regard, the processor of the control part 2 uses any automatic focusing technique such as a contrast automatic focusing technique and a phase difference automatic focusing technique to drive the lens actuator AF, thereby realizing the focusing operations for the second optical system OS2.

The imaging part S has a function of imaging the first subject image formed by the first optical system OS1 and the second subject image formed by the second optical system OS2 to obtain an image signal of the first subject image and an image signal of the second subject image. In the present embodiment, the imaging part S includes the first image sensor S1 for imaging the first subject image to obtain the image signal of the first subject image and the second image sensor S2 for imaging the second subject image to obtain the image signal of the second subject image.

A separation distance from a rear principal point of the first optical system OS1 to the imaging surface of the first image sensor S1 is adjusted so that the first subject image of the subject 100 located at an arbitrary distance set at the time of configuring the distance measuring camera 1 is formed on the imaging surface of the first image sensor S1 in the in-focus state. In other words, the first optical system OS1 and the first image sensor S1 are arranged so as to focus on the arbitrary distance set at the time of configuring the distance measuring camera 1.

On the other hand, a separation distance from a rear principal point of the second optical system OS2 to the imaging surface of the second image sensor S2 is adjusted so that the second subject image of the subject 100 located at the infinite distance point is formed on the imaging surface of the second image sensor S2 in the in-focus state in an initial state that the focusing operation for the second optical system OS2 is not performed by the lens actuator AF (in a state that the second optical system OS2 is illustrated by a dotted line in FIG. 6). In other words, the second optical system OS2 and the second image sensor S2 are arranged so as to focus on the infinite distance point in the initial state that the focusing operation for the second optical system OS2 is not performed by the lens actuator AF. Thus, in the initial state, the separation distance from the rear principal point of the second optical system OS2 to the imaging surface of the second image sensor S2 is equal to the focal length "$f_2$" of the second optical system OS2. Therefore, when the subject 100 is located at the arbitrary distance "a", the at least one lens (such as the focusing lens) constituting the second optical system OS2 is moved in accordance with the control from the processor of the control part 2 by the lens actuator AF and the front principal point and the rear principal point of the second optical system OS2 are shifted to the side of the subject 100 by the shift amount "s". As a result, the subject 100 located at the arbitrary distance "a" is in focus.

In this regard, although the first image sensor S1 and the first optical system OS1 are provided in one housing and the second image sensor S2, the lens actuator AF and the second optical system OS2 are provided in another housing in the aspect shown in the FIG. 6, the present invention is not limited thereto. An aspect in which all of the first optical system OS1, the second optical system OS2, the lens actuator AF, the first image sensor S1 and the second image sensor S2 are provided in one housing is also involved in the scope of the present invention.

The first image sensor S1 and the second image sensor S2 may be a color image sensor having a color filter such as an RGB primary color filter or a CMY complementary color filter arranged in any pattern such as a bayer arrangement or a monochrome image sensor without such a color filter.

The first subject image is formed on the imaging surface of the first image sensor S1 by the first optical system OS1 and the color or monochrome image signal of the first subject image is obtained by the first image sensor S1. The obtained image signal of the first subject image is transmitted to the control part 2 and the distance calculating part 4 through the data bus 9. In the same manner, the second subject image is formed on the imaging surface of the second image sensor S2 by the second optical system OS2 and the color or monochrome image signal of the second subject image is obtained by the second image sensor S2. The obtained image signal of the second subject image is transmitted to the control part 2 and the distance calculating part 4 through the data bus 9. The image signal of the first subject image and the image signal of the second subject image transmitted to the distance calculating part 4 are used for calculating the distance "a" to the subject 100. On the other hand, the image signal of the first subject image and the image signal of the second subject image transmitted to the control part 2 are used for image displaying due to the display part 6 and communication of the image signals due to the communication part 8.

The association information storage part 3 is an arbitrary non-volatility storage medium (such as a hard disk and a flash memory) for storing the association information for associating the image magnification ratio "MR" ("$M_1$"/"$M_2$") between the magnification "$M_1$" of the first subject image and the magnification "$M_2$" of the second subject image with the distance "a" from the front principal point of the second optical system OS2 to the subject 100.

The association information stored in the association information storage part 3 is information for calculating the distance "a" from the front principal point of the second optical system OS2 to the subject 100 from the image magnification ratio "MR" ("$M_1$"/"$M_2$") between the magnification "$M_1$" of the first subject image and the magnification "$M_2$" of the second subject image. Typically, the association information stored in the association information storage part 3 contains the above general equations (23) and (24) for calculating the distance "a" to the subject 100 based on the image magnification ratio "MR" and the above-described fixed values used in these general equations and determined by the configurations and the arrangements of the first optical system OS1 and the second optical system OS2.

The distance calculating part 4 has a function of calculating the distance "a" to the subject 100 based on the first subject image and the second subject image imaged by the imaging part S. The distance calculating part 4 receives the image signal of the first subject image from the first image sensor S1 of the imaging part S and receives the image signal of the second subject image from the second image sensor S2 of the imaging part S.

After that, the distance calculating part 4 subjects an arbitrary edge extraction process known in the art (for example, a filtering process such as a Canny method) to the image signal of the first subject image and the image signal of the second subject image to extract edge portions of the first subject image in the image signal of the first subject image and edge portions of the second subject image in the image signal of the second subject image. The distance calculating part 4 calculates an actual size (image width or image height) "$Sz_1$" of the first subject image based on the extracted edge portions of the first subject image and calculates an actual size (image width or image height) "$Sz_2$" of the second subject image based on the extracted edge portions of the second subject image.

A method for calculating the size "$Sz_1$" of the first subject image and the size "$Sz_2$" of the second subject image based on the edge portions of the first subject image and the edge portions of the second subject image extracted by the distance calculating part 4 is not particularly limited to a specific method. For example, it may be possible to consider a separation distance between an uppermost edge portion and a lowest edge portion among the edge portions of the subject image in the image signal as the image height of the subject image or consider a separation distance between a leftmost edge portion and a rightmost edge portion among the edge portions of the subject image in the image signal as the image width of the subject image.

After that, the distance calculating part 4 calculates the ratio "$Sz_1$"/"$Sz_2$" between the calculated actual size "$Sz_1$" of the first subject image and the calculated corresponding actual size "$Sz_2$" of the second subject image as the image magnification ratio "MR" between the magnification "$M_1$" of the first subject image and the magnification "$M_2$" of the second subject image. After the image magnification ratio "MR" is calculated, the distance calculating part 4 uses the above-described general equations (23) and (24) and the fixed values used in these general equations contained in the association information stored in the association information storage part 3 to calculate the two solutions for the distance "a". Then, the distance calculating part 4 uses the above-described method for determining which solution of the two solutions is proper as the distance "a" to calculate (identify) one of the two solutions as the distance "a" to the subject 100 (if the two solutions are equal to each other, both of the two solutions are calculated (identified) as the distance "a" to the subject 100). Further, the distance calculating part 4 can use the above equation (3) to calculate the distance "A" from the front principal point of the first optical system OS1 to the subject 100 from the distance "a" from the front principal point of the second optical system OS2 to the subject 100.

The three-dimensional image creating part 5 has a function of creating a three-dimensional image of the subject 100 based on the distance "a" to the subject 100 calculated by the distance calculating part 4 and the two-dimensional image of the subject 100 (that is the image signal of the first subject image or the image signal of the second subject image) obtained by the imaging part S. The words of "the three-dimensional image of the subject 100" mean data in which the calculated distance "a" to the subject 100 is associated with pixels of the color or monochrome two-dimensional image of the subject 100.

The display part 6 is a panel type display part such as a liquid crystal display. The display part 6 displays various information containing images such as the two-dimensional image of the subject 100 (the image signal of the first subject image or the image signal of the second subject image) obtained by the imaging part S and the three-dimensional image of the subject 100 created by the three-dimensional image creating part 5, the distance "a" to the subject 100 calculated by the distance calculating part 4 and information required for operating the distance measuring camera 1 in the form of characters or images in accordance with the control from the processor of the control part 2.

The operation part 7 is used for performing operations by the user of the distance measuring camera 1. The operation part 7 is not particularly limited to a specific kind as long as the user of the distance measuring camera 1 can use the operation part 7 to perform the operations. For example, it is possible to employ a mouse, a keyboard, a numeric keypad, a button, a dial, a lever, a touch panel or the like as the operation part 7. The operation part 7 transmits signals respectively corresponding to the operations from the user of the distance measuring camera 1 to the processor of the control part 2.

The communication part 8 has a function of inputting data into the distance measuring camera 1 and/or outputting data from the distance measuring camera 1 to external devices. The communication part 8 may be configured to be connectable to a network such as the Internet. In this case, the distance measuring camera 1 can communicate with an external device such as an externally provided web server or data server by using the communication part 8.

As described above, in the distance measuring camera 1 of the present embodiment, the first optical system OS1 and the second optical system OS2 are configured so that the focal length "$f_1$" of the first optical system OS1 and the focal length "$f_2$" of the second optical system OS2 are different from each other ("$f_1$"≠"$f_2$"), and thereby the change of the magnification "$M_1$" of the first subject image with respect to the distance "a" to the subject 100 and the change of the magnification "$M_2$" of the second subject image with respect to the distance "a" to the subject 100 are different from each other. Therefore, the distance measuring camera 1 of the present embodiment can uniquely calculate (identify) the distance "a" from the front principal point of the second optical system OS2 to the subject 100 (and the distance "A" from the front principal point of the first optical system OS1 to the subject 100) based on the image magnification ratio "MR" ("$M_1$"/"$M_2$") of the magnification "$M_1$" of the first subject image and the magnification "$M_2$" of the second subject image without using any parallel disparities among a plurality of images and without projecting any constant pattern onto the subject 100.

Second Embodiment

Figure 7:
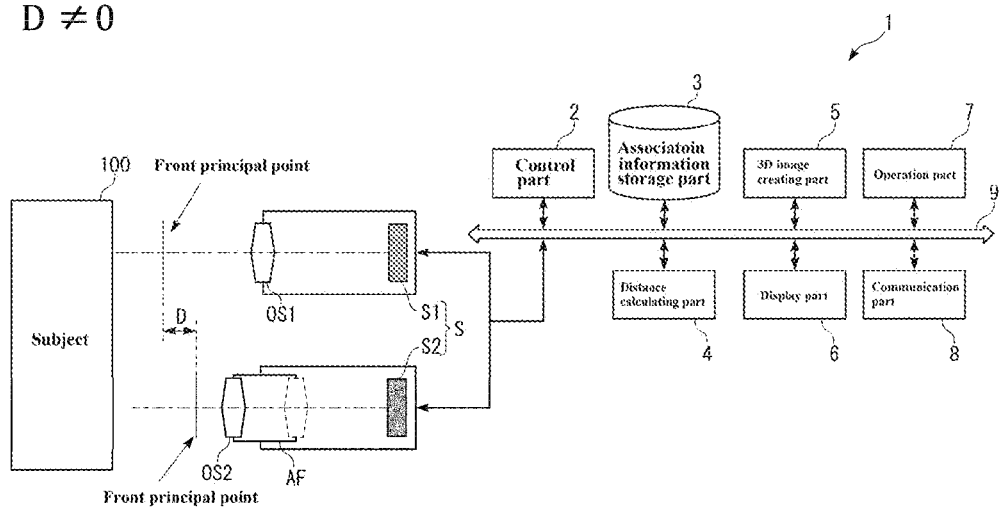
FIG. 7 is a block diagram schematically showing a distance measuring camera according to a second embodiment of the present invention.

Next, a distance measuring camera 1 according to a second embodiment of the present invention will be described in detail with reference to FIG. 7. FIG. 7 is a block diagram schematically showing the distance measuring camera according to the second embodiment of the present invention.

Hereinafter, the distance measuring camera 1 of the second embodiment will be described by placing emphasis on the points differing from the distance measuring camera 1 of the first embodiment with the same matters being omitted from the description. The distance measuring camera 1 of the second embodiment has the same configuration as that of the distance measuring camera 1 of the first embodiment except that the configurations and the arrangements of the first optical system OS1 and the second optical system OS2 are modified.

The distance measuring camera 1 of the present embodiment is characterized in that the first optical system OS1 and the second optical system OS2 are configured and arranged so as to satisfy the second condition that the depth disparity "D" in the optical axis direction exists between the front principal point of the first optical system OS1 and the front principal point of the second optical system OS2 among the above-mentioned two conditions required to calculate the distance "a" to the subject 100 based on the image magnification ratio "MR". On the other hand, in the present embodiment, the first optical system OS1 and the second optical system OS2 are configured so as not to satisfy the first conditions ("$f_1$"≠"$f_2$") among the above-mentioned first and second conditions.

As described above, the distance measuring camera 1 of the present embodiment, the first optical system OS1 and the second optical system OS2 are configured and arranged so that the depth disparity "D" in the optical axis direction exists between the front principal point of the first optical system OS1 and the front principal point of the second optical system OS2 ("D"≠0), and thereby the change of the magnification "$M_1$" of the first subject image with respect to the distance "a" to the subject 100 and the change of the magnification "$M_2$" of the second subject image with respect to the distance "a" to the subject 100 are different from each other. Therefore, the distance measuring camera 1 of the present embodiment can uniquely calculate the distance "a" from the front principal point of the second optical system 052 to the subject 100 based on the image magnification ratio "MR" ("$M_1$"/"$M_2$") of the magnification "$M_1$" of the first subject image and the magnification "$M_2$" of the second subject image. Further, the distance calculating part 4 can use the above equation (3) to calculate the distance "A" from the front principal point of the first optical system OS1 to the subject 100 from the distance "a" from the front principal point of the second optical system OS2 to the subject 100.

According to this embodiment, it is also possible to provide the same effects as those of the above-described first embodiment. In this regard, the configurations and arrangements of the first optical system OS1 and the second optical system OS2 in the present embodiment may be any aspect as long as the above-described second condition ("D"≠0) is satisfied, and thereby the change of the magnification "$M_1$" of the first subject image with respect to the distance to the subject 100 and the change of the magnification "$M_2$" of the second subject image with respect to the distance to the subject 100 are different from each other.

Third Embodiment

Figure 8:
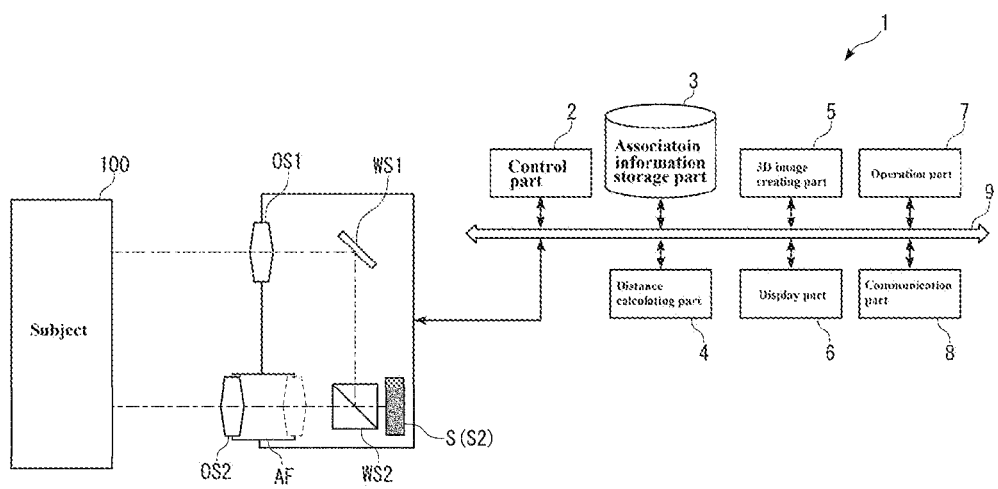
FIG. 8 is a block diagram schematically showing a distance measuring camera according to a third embodiment of the present invention.

Next, a distance measuring camera 1 according to a third embodiment of the present invention will be described in detail with reference to FIG. 8. FIG. 8 is a block diagram schematically showing the distance measuring camera according to the third embodiment of the present invention.

Hereinafter, the distance measuring camera 1 of the third embodiment will be described by placing emphasis on the points differing from the distance measuring cameras 1 of the first embodiment and the second embodiment with the same matters being omitted from the description. The distance measuring camera 1 of the third embodiment has the same configuration as that of the distance measuring camera 1 of the first embodiment except that the imaging part S is constituted of only the second image sensor S2, the first optical system OS1 and the second optical system OS2 are provided in one housing, a first wavelength selection element WS1 for restricting a wavelength of the light forming the first subject image is provided on an optical path of the light for forming the first subject image, a second wavelength selection element WS2 for restricting a wavelength of the light forming the second subject image is provided on an optical path of the light for forming the second subject image and the second image sensor S2 is limited to a color image sensor.

In the present embodiment, the first optical system OS1 and the second optical system OS2 are configured so as to satisfy at least one of the first condition and the second condition required for calculating the distance "a" to the subject 100 based on the magnification ratio "MR". Namely, the first optical system 051 and the second optical system OS2 in the present embodiment are configured so as to have the same configuration as those of the first optical system OS1 and the second optical system OS2 of one of the first embodiment and the second embodiment or a combination thereof.

Further, as shown in FIG. 8, the first optical system OS1 and the second optical system OS2 are provided in the one housing in the present embodiment. Further, the first wavelength selection element WS1 is provided on the optical path of the light collected by the first optical system OS1 to form the first subject image. Furthermore, the second wavelength selection element WS2 is provided on the optical path of the light collected by the second optical system OS2 to form the second subject image.

In the present embodiment, the first wavelength selection element WS1 is a wavelength selection plate-type mirror. The first wavelength selection element WS1 has a function of selectively reflecting only light having a restricted wavelength band. The second wavelength selection element WS2 is a wavelength selection prism-type mirror. The second wavelength selection element WS2 has a function of restricting a wavelength band of light entering from one side of the prism for allowing only light having a restricted wavelength band to pass through the prism and a function of reflecting light entering from the other side of the prism. The first wavelength selection element WS1 and the second wavelength selection element WS2 are configured so that the wavelength band of the light restricted by the first wavelength selection element WS1 is different from the wavelength of the light restricted by the second wavelength selection element WS2.

The light from the subject 100 which is collected by the first optical system OS1 is reflected by the first wavelength selection element WS1 (the wavelength selection plate-type mirror). At this time, the wavelength of the light collected by the first optical system OS1 is restricted by the first wavelength selection element WS1. After that, the light reflected by the first wavelength selection element WS1 is reflected by the second wavelength selection element WS2 (the wavelength selection prism-type mirror) and reaches to the imaging surface of the second image sensor S2. With this configuration, the first subject image is formed on the imaging surface of the second image sensor S2. In this regard, the second wavelength selection element WS2 may be configured to further restrict the wavelength of the light for forming the first subject image when the light for forming the first subject image is reflected by the second wavelength selection element WS2. Alternatively, the second wavelength selection element WS2 may be configured not to further restrict the wavelength of the light for forming the first subject image when the light for forming the first subject image is reflected by the second wavelength selection element WS2.

On the other hand, the light from the subject 100 which is collected by the second optical system OS2 passes through the second wavelength selection element WS2 (the wavelength selection prism-type mirror). At this time, the wavelength of the light collected by the second optical system OS2 is restricted by the second wavelength selection element WS2. After that, the light passing through the second wavelength selection element WS2 reaches to the imaging surface of the second image sensor S2. With this configuration, the second subject image is formed on the imaging surface of the second image sensor S2.

Thus, in the present embodiment, both of the first subject image formed by the first optical system OS1 and the second subject image formed by the second optical system OS2 are formed on the imaging surface of the second image sensor S2. Further, as described above, since the wavelength band of the light restricted by the first wavelength selection element WS1 is different from the wavelength band of the light restricted by the second wavelength selection element WS2, the wavelength of the light forming the first subject image and the wavelength of the light forming the second subject image are different from each other.

In the present embodiment, the second image sensor S2 is a color image sensor having a color filter such as an RGB primary color filter or a CMY complementary color filter in which a plurality of different color filters are arranged in any pattern such as a bayer arrangement. The wavelength band of the light restricted by the first wavelength selection element WS1 corresponds to any one of the color filters of the second image sensor S2. The wavelength band of the light restricted by the second wavelength selection element WS2 corresponds to another one of the color filters of the second image sensor S2.

With this configuration, one of image signals respectively corresponding to the color filters obtained by the second image sensor S2 (for example, one of red color image signal, green color image signal and yellow color image signal) corresponds to the image signal of the first subject image and another one of the image signals corresponds to the image signal of the second subject image. Thus, the second image sensor S2 can separately obtain the image signal of the first subject image and the image signal of the second subject image at the same time.

For example, in a case that the wavelength band of the light restricted by the first wavelength selection element WS1 corresponds to a transparent wavelength band of a red color filter of the color filters of the second image sensor S2, a red color image signal obtained by the second image sensor S2 is the image signal of the first subject image. On the other hand, in a case that the wavelength band of the light restricted by the second wavelength selection element WS2 corresponds to a transparent wavelength band of a green color filter of the color filters of the second image sensor S2, a green color image signal obtained by the second image sensor S2 is the image signal of the second subject image.

With this configuration, the imaging part S can be constituted of a single color image sensor (the second image sensor S2) for imaging both of the first subject image formed by the first optical system OS1 and the second subject image formed by the second optical system OS2. Thus, it is possible to the downsizing and the cost-reduction of the distance measuring camera 1.

Although the wavelength selection plate-type mirror is used as the first wavelength selection element WS1 and the wavelength selection prism-type mirror is used as the second wavelength selection element WS2 in the present embodiment, the present invention is not limited thereto. Each of the first wavelength selection element WS1 and the second wavelength selection element WS2 may take any aspect as long as it can restrict the wavelength band of each of the light for forming the first subject image and the second subject image. For example, a wavelength selection filter or an arbitrary optical element having a wavelength selection function provided on the front or rear side of the first optical system OS1 may be used as the first wavelength selection element WS1. Further, a wavelength selection filter or an arbitrary optical element having a wavelength selection function provided on the front or rear side of the second optical system OS2 may be used as the second wavelength selection element WS2. In this case, a normal mirror is provided at a position where the first wavelength selection element WS1 of the present embodiment is provided and a normal prism-type mirror is provided at a position where the second wavelength selection element WS2 of the present embodiment is provided.

Further, although the first wavelength selection element WS1 and the second wavelength selection element WS2 are used for allowing the single image sensor (the second image sensor S2) to image both of the first subject image formed by the first optical system OS1 and the second subject image formed by the second optical system OS2 in the present embodiment, the present invention is not limited thereto. For example, the scope of the present invention also involves an aspect in which a shutter is provided in front of each of the first optical system OS1 and the second optical system OS2 and the shutter provided in front of the first optical system OS1 and the shutter provided in front of the second optical system OS2 are alternately opened to allow the single image sensor (the second image sensor S2) to image both of the first subject image and the second subject image.

As described above in detail referring to each embodiment, the distance measuring camera 1 of the present invention can uniquely calculate the distance "a" to the subject 100 based on the image magnification ratio "MR" ("$M_1$"/"$M_2$") between the magnification "$M_1$" of the first subject image and the magnification "$M_2$" of the second subject image without using any parallel disparity between a plurality of images and without irradiating any constant pattern onto the subject 100.

Therefore, since the distance measuring camera 1 of the present invention does not need to ensure a large parallel disparity unlike the conventional stereo camera type distance measuring camera using a parallel disparity between a plurality of images, it is possible to accurately calculate the distance "a" to the subject 100 even if the first optical system OS1 and the second optical system OS2 are arranged so as to be close to each other in the parallel direction perpendicular to the optical direction. Thus, it is possible to reduce the size of the distance measuring camera 1 as compared with the conventional stereo camera type distance measuring camera. Further, according to the present invention, it becomes unnecessary to design the distance measuring camera 1 with considering the parallel disparities. Thus, it is possible to enhance the flexibility of design for the distance measuring camera. Furthermore, since the distance measuring camera 1 of the present invention does not use any parallel disparity to calculate the distance "a" to the subject 100, it is possible to accurately calculate the distance "a" to the subject 100 even if the subject 100 is located at a position very close to the distance measuring camera 1.

Further, in the distance measuring camera 1 of the present invention, it is not necessary to use a special light source such as a projector for projecting the constant pattern light onto the subject 100 unlike the conventional pattern projection type distance measuring camera. Thus, it is possible to simplify a system configuration of the distance measuring camera. As a result, it is possible to realize downsizing, weight-saving, power-saving and cost-reduction of the distance measuring camera 1 compared with the conventional pattern projection type distance measuring camera. Furthermore, since the distance measuring camera 1 of the present invention does not need to use any special light source for irradiating light having a wavelength outside the visible range unlike the conventional pattern projection type distance measuring camera, the distance measuring camera 1 of the present invention can also perform normal photographing.

Further, the distance measuring camera 1 of the present invention calculates the distance "a" to the subject 100 based on the image magnification ratio "MR" ("$M_1$"/"$M_2$") between the magnification "$M_1$" of the first subject image and the magnification "$M_2$" of the second subject image. Thus, if the parameters of each optical system and the imaging part (for example, the focal length, the distance from the exit pupil to the imaging surface of the image sensor) are known, it is possible to calculate the distance "a"

to the subject 100 even if these parameters are not uniformed. In other words, even if the first optical system OS1 and the second optical system OS2 have different characteristic (for example, different focal lengths, positions of the front principal points, positions of the rear principal points), the present invention can calculate the distance "a" to the subject 100 with the image magnification ratio "MR" between the subject images respectively formed by the optical system having the different characteristics.

In recent years, an imaging system using a combination of optical systems having different characteristics, that is a combination of a fixed focus optical system having a wide view of field and a low magnification which is used for a wide-angle shot and an autofocus optical system having a narrow view of field and a high magnification which is used for a zoom shot has been widely used in a mobile device such as a smart-phone. The present invention can be also applied to such an imaging system which has been used for the existing mobile device. By applying the present invention to the existing imaging system using the combination of the optical systems having the different characteristics, it is possible to measure the distance "a" to the subject 100 and create the three-dimensional image of the subject 100 (measure the shape of the subject 100) without drastically modifying the configuration of the existing mobile device. As described above, according to the present invention, it is possible to measure the distance "a" to the subject 100 and create the three-dimensional image of the subject 100 (measure the shape of the subject 100) without disturbing the wide-angle shot and the zoom shot provided by the existing imaging system. Thus, the distance measuring camera 1 of the present invention has general-purpose versatility unlike the conventional distance measuring camera.

Further, although the two optical systems (the first optical system OS1 and the second optical system OS2) are used in the above embodiments, the number of the optical systems used in the present invention is not limited thereto. For example, an aspect further comprising an additional optical system in addition to the first optical system OS1 and the second optical system OS2 is also involved within the scope of the present disclosure. In this case, the additional optical system is configured and arranged so that a change of a magnification of a subject image formed by the additional optical system with respect to the distance "a" to the subject 100 is different from the change of the magnification "$M_1$" of the first subject image with respect to the distance "a" to the subject 100 and the change of the magnification "$M_2$" of the second subject image with respect to the distance "a" to the subject 100.

Further, although the first optical system OS1 and the second optical system OS2 are configured and arranged so as to satisfy one of the first condition and the second condition required to calculate the distance "a" to the subject 100 based on the image magnification ratio "MR" in each embodiment described above, the present invention is not limited thereto as long as the first optical system OS1 and the second optical system OS2 are configured and arranged so as to satisfy at least one of the first condition and the second conditions. For example, an aspect in which the first optical system OS1 and the second optical system OS2 are configured and arranged so as to satisfy both of the first condition and the second condition (for example, an aspect in which the first optical system OS1 and the second optical system OS2 are configured and arranged as shown in FIG. 3) is also involved within the scope of the present invention.

Distance Measuring Method

Figure 9:
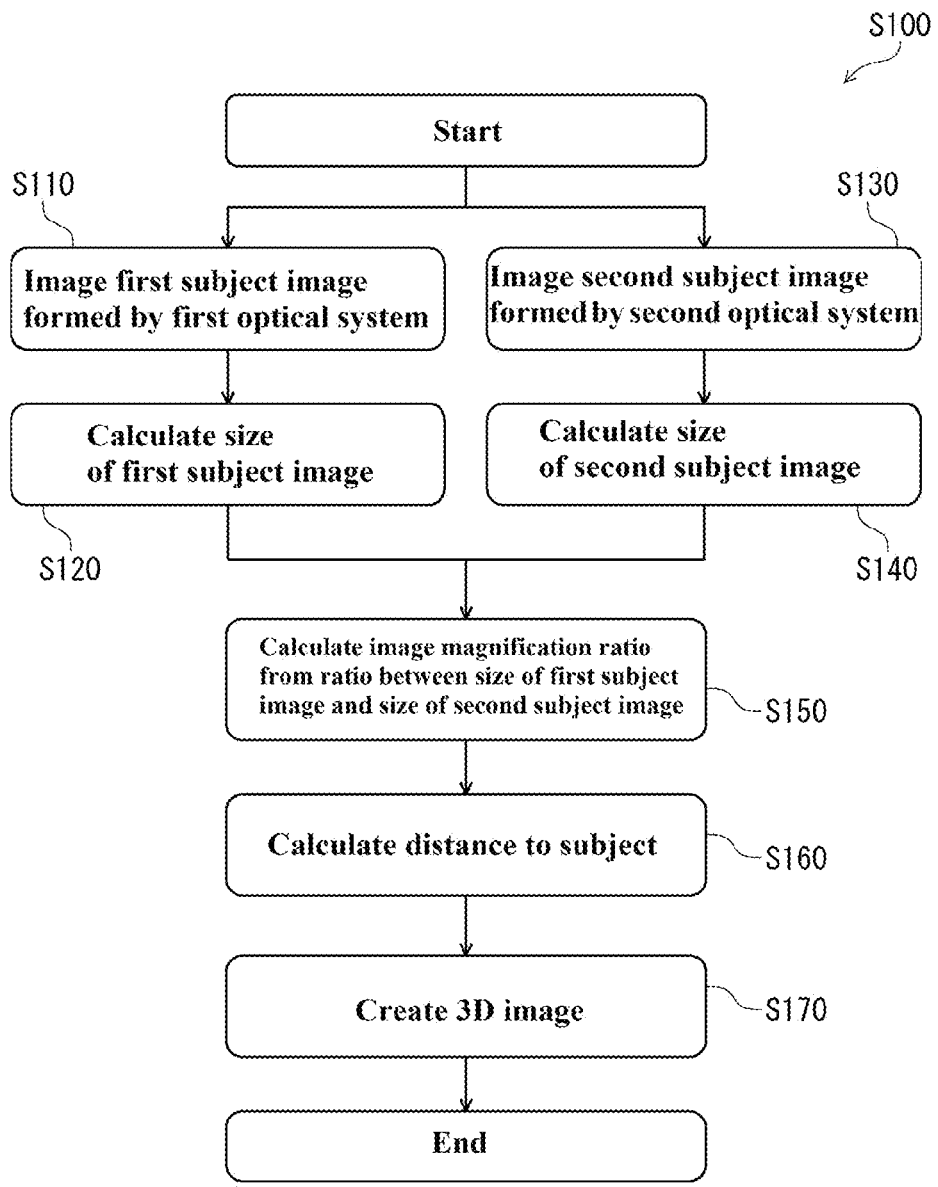
FIG. 9 is a flowchart for explaining a distance measuring method performed by the distance measuring camera of the present invention.

Next, a distance measuring method performed by the distance measuring camera 1 of the present invention will be described with reference to FIG. 9. FIG. 9 is a flowchart for explaining the distance measuring method performed by the distance measuring camera of the present invention. Although the distance measuring method described in detail below can be performed by using the distance measuring cameras 1 according to the first to third embodiments of the present invention and an arbitrary apparatus having the same function as that of the distance measuring camera 1 described above, for the sake of explanation, it is assumed that the distance measuring method is performed by using the distance measuring camera 1 according to the first embodiment.

A distance measuring method S100 shown in FIG. 9 is started when the user of the distance measuring camera 1 uses the operation part 7 to perform an operation for measuring the distance "a" to the subject 100. At a step S110, the first image sensor S1 of the imaging part S images the first subject image formed by the first optical system OS1 to obtain the image signal of the first subject image. The image signal of the first subject image is transmitted to the control part 2 and the distance calculating part 4 through the data bus 9. At a step S120, the distance calculating part 4 calculates the actual size (image height or image width) "$Sz_1$" of the first subject image from the received image signals of the first subject image.

On the other hand, at a step S130, the lens actuator AF is driven in accordance with the control from the processor of the control part 2 to perform the focusing operation for the second optical system OS2 for focusing on the subject 100. After that, the second subject image formed by the second optical system OS2 is imaged by the second image sensor S2 of the imaging part S and the image signal of the second subject image is obtained. The image signal of the second subject image is transmitted to the control part 2 and the distance calculating part 4 through the data bus 9. At a step S140, the distance calculating part 4 calculates the actual size (image height or image width) "$Sz_2$" of the second subject image from the received image signal of the second subject image.

In this regard, to obtain the image signal of the first subject image at the step S110 and to calculate the size "$Sz_1$" of the first subject image at the step S120 may be performed simultaneously to obtain the image signal of the second subject image at the step S130 and to calculate the actual size "$Sz_2$" of the second subject image at the step S140, or may be performed separately.

When both the actual size "$Sz_1$" of the first subject image and the actual size "$Sz_2$" of the second subject image are calculated, the process proceeds to a step S150. At the step S150, the distance calculating part 4 calculates the image magnification ratio "MR" of the magnification "$M_1$" of the first subject image and the magnification "$M_2$" of the second subject image based on the actual size "$Sz_1$" of the first subject image and the actual size "$Sz_2$" of the second subject image according to the above equation (25) "MR"="$Sz_1$"/"$Sz_2$".

Next, at a step S160, the distance calculating part 4 refers to the association information stored in the association information storage part 3 and calculates (identify) the distance "a" to the subject 100 based on the calculated image magnification ratio "MR". Specifically, when the image magnification ratio "MR" is calculated, the distance calculating part 4 refers to the above-described general equations (23) and (24) and the fixed values used in these general equations contained in the association information stored in the association information storage part 3 to obtain the two solutions for the distance "a". Then, the distance calculating part 4 uses the above-described method for determining which solution of the two solutions is proper as the distance "a" to calculate (identify) one of the two solutions as the distance "a" to the subject 100 (if the two solutions are equal to each other, both of the two solutions are calculated (identified) as the distance "a" to the subject 100). When the distance "a" to the subject 100 from the front principal point of the second optical system OS2 to the subject 100 is calculated at the step S160, the process proceeds to a step S170. In this regard, the distance calculating part 4 may use the above equation (3) to further calculate the distance "A" from the front principal point of the first optical system OS1 to the subject 100 from the distance "a" from the front principal point of the second optical system OS2 to the subject 100 at the step S160.

At the step S170, the three-dimensional image creating part 5 creates the three-dimensional image of the subject 100 based on the distance "a" from the front principal point of the second optical system OS2 to the subject 100 calculated by the distance calculating part 4 and the two-dimensional image of the subject 100 (the image signal of the first subject image or the image signal of the second subject image) obtained by the imaging part S. After that, the two-dimensional image of the subject 100, the distance "a" to the subject 100 and/or the three-dimensional image of the subject 100 obtained in the previous steps are displayed on the display part 6 or transmitted to an external device by the communication part 8. Next, the distance measuring method S100 ends.

Although the distance measuring camera of the present invention has been described based on the embodiments shown in the drawings, the present invention is not limited thereto. Each configuration of the present invention can be replaced with any configuration capable of performing the same function or any configuration can be added to each configuration of the present invention.

A person having skill in the art and the field to which the present invention belongs would be able to carry out modifications of the described configuration of the distance measuring camera of the present invention without meaningfully departing from the principles, ideas and scope of the present invention. Further, distance measuring cameras having modified configurations are also involved within the scope of the present invention.

For example, the number and types of components of the distance measuring camera shown in FIGS. 6 to 8 are merely illustrative examples, and the present invention is not necessarily limited thereto. An aspect in which any component is added or combined or any component is omitted without departing from the principle and intent of the present invention is also involved within the scope of the present invention. Further, each component of the distance measuring camera 1 may be practiced by hardware, software or a combination thereof.

In addition, the number and types of the steps of the distance measuring method S100 shown in FIG. 9 are merely illustrative examples and the present invention is not necessarily limited thereto. Further, an aspect that any steps have been added or combined for any purpose or any steps have been omitted without departing from the principle and intent of the present invention is also involved within the scope of the present invention.

Examples of Application

An example of application of the distance measuring camera 1 of the present invention is not particularly limited. For example, the distance measuring camera 1 can be used for imaging a portrait of the subject and obtaining the three-dimensional image of the face of the subject. In such an application, it is preferable to incorporate the distance measuring camera 1 of the present invention into a mobile device such as a smart phone or a mobile phone.

Further, the distance measuring camera 1 of the present invention can be applied for a handler robot used for assembling and inspecting a precision device. According to the distance measuring camera 1, since it is possible to measure a distance from an arm or a main body of the handler robot to the precision device or parts thereof when assembling the precision device, it becomes possible to allow a gripping portion of the handler robot to accurately grip the parts.

Further, since the distance measuring camera 1 of the present invention can measure the distance to the subject, it is possible to obtain three-dimensional information of the subject. Such three-dimensional information of the subject can be used for forming a three-dimensional structure due to a 3D printer.

Further, by utilizing the distance measuring camera 1 of the present invention for a vehicle, it is possible to measure the distance from the vehicle to any object such as a pedestrian or an obstacle. Information on the calculated distance to any subject can be used for automatic braking systems and automatic driving of the vehicle.

INDUSTRIAL APPLICABILITY

The distance measuring camera of the present invention uses the two optical systems configured so that the changes of the magnifications of the subject images according to the distance to the subject are different from each other and can measure the distance to the subject based on the image magnification ratio (the ratio of the magnifications) between the two subject images respectively formed by the two optical systems. Thus, in the distance measuring camera of the present invention, it is not necessary to ensure a large parallel disparity unlike the conventional stereo camera type distance measuring camera using parallel disparities among a plurality of images. Therefore, even if the two optical systems are arranged so as to be close to each other in the parallel direction perpendicular to the optical axis direction, it is possible to accurately calculate the distance to the subject. As a result, it is possible to reduce a size of the distance measuring camera compared with the conventional stereo camera type distance measuring camera. Further, according to the present invention, it becomes unnecessary to design the distance measuring camera with considering the parallel disparities. Thus, it is possible to enhance the flexibility of design for the distance measuring camera. Furthermore, since the distance measuring camera of the present invention does not use any parallel disparity to calculate the distance to the subject, it is possible to accurately calculate the distance to the subject even if the subject is located at a position very close to the distance measuring camera.

Further, in the distance measuring camera of the present invention, it is not necessary to use the special light source such as a projector for projecting constant pattern light onto the subject unlike the conventional pattern projection type distance measuring camera. Thus, it is possible to simplify the system configuration of the distance measuring camera. As a result, it is possible to realize the downsizing, the weight-saving, the power-saving and the cost-reduction of the distance measuring camera compared with the conventional pattern projection type distance measuring camera. Furthermore, since the distance measuring camera of the present invention does not need to use any special light source for irradiating light having a wavelength outside the visible range unlike the conventional pattern projection type distance measuring camera, the distance measuring camera of the present invention can also perform normal photographing.

The invention claimed is:

1. A distance measuring camera, comprising:
a first optical system for collecting light from a subject to form a first subject image;
a second optical system for collecting the light from the subject to form a second subject image;
an imaging part for imaging the first subject image formed by the first optical system and the second subject image formed by the second optical system; and
a distance calculating part for calculating a distance to the subject based on the first subject image and the second subject image imaged by the imaging part,
wherein the distance calculating part calculates the distance to the subject by using:
an image magnification ratio between a magnification of the first subject image and a magnification of the second subject image,
a focal length of the first optical system,
a focal length of the second optical system,
a distance from an exit pupil of the first optical system to an image formation position of the first subject image when the subject is located at an infinite distance point,
a distance from a front principal point of the first optical system to the subject when the first subject image takes an in-focus state on an imaging surface of the imaging part, and
a total shift amount of a position of the front principal point of the first optical system from a position of the front principal of the first optical system when the first optical system is configured so as to focus on the infinite distance point, and
wherein the second optical system is an autofocus optical system configured so that at least one lens constituting the second optical system can be actuated.

2. The distance measuring camera as claimed in claim 1, wherein the first optical system is a fixed focus optical system.

3. The distance measuring camera as claimed in claim 1, wherein the first optical system and the second optical system are configured so that a change of the magnification of the first subject image according to the distance to the subject is different from a change of the magnification of the second subject image according to the distance to the subject.

4. The distance measuring camera as claimed in claim 3, wherein the first optical system and the second optical system are configured so that the focal length of the first optical system and the focal length of the second optical system are different from each other, and thereby the change of the magnification of the first subject image according to the distance to the subject is different from the change of the magnification of the second subject image according to the distance to the subject.

5. The distance measuring camera as claimed in claim 3, wherein a depth disparity in an optical axis direction exists between the front principal point of the first optical system and a front principal point of the second optical system, and thereby the change of the magnification of the first subject image according to the distance to the subject is different from the change of the magnification of the second subject image according to the distance to the subject.

6. The distance measuring camera as claimed in claim 1, further comprising an association information storage part storing association information for associating the image magnification ratio between the magnification of the first subject image and the magnification of the second subject image with the distance to the subject,
wherein the distance calculating part calculates the distance to the subject based on the image magnification ratio between the magnification of the first subject image and the magnification of the second subject image and the association information in the association information storage part.

7. The distance measuring camera as claimed in claim 1, wherein the distance calculating part calculates a ratio between a size of the first subject image and a size of the second subject image as the image magnification ratio between the magnification of the first subject image and the magnification of the second subject image.

8. The distance measuring camera as claimed in claim 1, wherein the imaging part is a single image sensor for imaging both of the first subject image and the second subject image.

9. The distance measuring camera as claimed in claim 8, further comprising a first wavelength selection element provided on an optical path of the light for forming the first subject image to restrict a wavelength of the light forming the first subject image and a second wavelength selection element provided on an optical path of the light for forming the second subject image to restrict a wavelength of the light forming the second subject image,
wherein a wavelength band of the light forming the first subject image which is restricted by the first wavelength selection element is different from a wavelength band of the light forming the second subject image which is restricted by the second wavelength selection element.

* * * * *